United States Patent
Nagasawa

(10) Patent No.: US 12,157,514 B2
(45) Date of Patent: Dec. 3, 2024

(54) AIRBAG DEVICE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/986,494

(22) Filed: Nov. 14, 2022

(65) Prior Publication Data

US 2023/0158993 A1 May 25, 2023

(30) Foreign Application Priority Data

Nov. 24, 2021 (JP) .................................. 2021-190140

(51) Int. Cl.
| | | |
|---|---|---|
| *B60R 21/015* | (2006.01) | |
| *B60R 21/0136* | (2006.01) | |
| *B60R 21/21* | (2011.01) | |
| *B60R 21/213* | (2011.01) | |
| *B62D 25/02* | (2006.01) | |

(52) U.S. Cl.
CPC ........ *B62D 25/025* (2013.01); *B60R 21/0136* (2013.01); *B60R 21/01508* (2014.10); *B60R 21/21* (2013.01); *B60R 21/213* (2013.01)

(58) Field of Classification Search
CPC ........ B60R 21/36; B60R 21/21; B60R 21/233
See application file for complete search history.

(56) References Cited

U.S. PATENT DOCUMENTS

| | | | | |
|---|---|---|---|---|
| 6,087,928 A | * | 7/2000 | Kleinberg | B60R 21/013 340/904 |
| 6,417,764 B2 | * | 7/2002 | Tonkin | B60T 7/12 340/436 |
| 6,883,631 B2 | * | 4/2005 | Hu | B60R 21/013 180/274 |
| 7,806,221 B2 | * | 10/2010 | Mishra | B60R 21/013 280/730.1 |
| 8,172,027 B2 | * | 5/2012 | Mishra | B60R 19/205 280/730.1 |

(Continued)

FOREIGN PATENT DOCUMENTS

| | | | | | |
|---|---|---|---|---|---|
| CN | 103158653 A | * | 6/2013 | ........... | B60R 19/205 |
| CN | 113147656 A | * | 7/2021 | ......... | B60R 21/0134 |

(Continued)

*Primary Examiner* — Nicole T Verley
(74) *Attorney, Agent, or Firm* — MCGINN I.P. LAW GROUP, PLLC

(57) ABSTRACT

An airbag device to be applied to a vehicle provided with A to C pillars, a door, and a side sill includes an airbag, a collision mode predictor, and a pressure controller. The airbag is deployed from a container to be disposed on a lower side of the side sill to a region on a vehicle-widthwise outside of a side surface of a vehicle body including the door. The airbag includes a first air chamber disposed mainly in front of the B pillar after being deployed and a second air chamber disposed mainly behind the B pillar after being deployed. The collision mode predictor predicts a collision mode of an object with the vehicle. The pressure controller increases or reduces at least either of internal pressures of the first air chamber and the second air chamber independently of the other, based on the predicted collision mode.

15 Claims, 13 Drawing Sheets

(56) References Cited

U.S. PATENT DOCUMENTS

| | | | |
|---|---|---|---|
| 9,452,666 B1 * | 9/2016 | Suh .......................... | B60R 19/42 |
| 10,434,970 B2 * | 10/2019 | Saito ........................ | B60R 21/21 |
| 11,072,307 B1 * | 7/2021 | Baccouche ............ | B60R 19/205 |
| 2003/0155750 A1 * | 8/2003 | Hu ........................ | B60R 21/013 |
| | | | 280/730.1 |
| 2004/0049331 A1 * | 3/2004 | Schneider ............. | B60R 19/205 |
| | | | 701/45 |
| 2016/0355152 A1 * | 12/2016 | Perez Garcia .......... | B60R 21/34 |
| 2023/0073588 A1 * | 3/2023 | Nagasawa ................ | B60R 21/36 |

FOREIGN PATENT DOCUMENTS

| | | | | |
|---|---|---|---|---|
| DE | 10203287 A1 | * | 8/2003 | ........... B60R 21/013 |
| EP | 2894067 A1 | * | 7/2015 | ............. B60R 21/21 |
| EP | 3333022 A1 | * | 6/2018 | ............ B60J 5/0444 |
| JP | H061027 U | * | 1/1995 | |
| JP | 2005537165 A | * | 12/2004 | |
| JP | 2008-526593 A | | 7/2008 | |
| JP | 2009173142 A | * | 8/2009 | |
| JP | 6740168 B2 | | 8/2020 | |
| JP | 6753324 B2 | * | 9/2020 | ............. B60R 21/01 |
| JP | 2023039538 A | * | 3/2023 | ............. B60R 21/36 |
| WO | WO-03053748 A1 | * | 7/2003 | ........... B60R 19/205 |
| WO | WO-2015090582 A1 | * | 6/2015 | ............. B60R 21/21 |

\* cited by examiner

AIRBAG DEVICE

CROSS-REFERENCE TO RELATED APPLICATIONS

The present application claims priority from Japanese Patent Application No. 2021-190140 filed on Nov. 24, 2021, the entire contents of which are hereby incorporated by reference.

BACKGROUND

The disclosure relates to an airbag device including an airbag configured to be deployed outside a vehicle upon a side collision of the vehicle.

In a vehicle such as an automobile, use of an airbag device including an airbag to be deployed outside the vehicle has been proposed to reduce damage to a vehicle body and an occupant upon a collision.

As techniques related to measures against a side collision of a vehicle, for example, Japanese Patent No. 6740168 discloses that an airbag is deployed to the vehicle-widthwise outside from an impact beam, i.e., a door beam, disposed to extend in a front-rear direction inside a door.

Japanese Unexamined Patent Application Publication (Translation of PCT Application) (JP-T) No. 2005-537165 discloses an occupant protection system including an external airbag system and a predictive collision detection system. In the occupant protection system, to protect an occupant in response to collision, an airbag including air chambers arranged in a front-rear direction is deployed to the vehicle-widthwise outside from the inside of a door near the occupant's seated position.

JP-T No. 2008-526593 discloses that, as airbags that sequentially operate to alleviate damage to a vehicle upon collision, airbags including inflation units are arranged in a horizontal direction on, for example, a side surface of a vehicle body.

SUMMARY

An aspect of the disclosure provides an airbag device to be applied to a vehicle. The vehicle is provided with an A pillar, a B pillar, a C pillar, a door, and a side sill. The A pillar, the B pillar, and the C pillar are structural members provided in order from a front side on a side surface of a vehicle body of the vehicle and extending in a vertical direction. The door is provided to be openable and closable at a door opening provided at one or both of a position between the A pillar and the B pillar and a position between the B pillar and the C pillar. The side sill is disposed along a lower edge of the door. The airbag device includes an airbag, a collision mode predictor, and a pressure controller. The airbag is configured to be deployed from a container to be disposed on a lower side of the side sill to a region on a vehicle-widthwise outside of the side surface of the vehicle body including the door, in response to a symptom of collision of an object with the side surface of the vehicle body. The airbag includes a first air chamber configured to be disposed mainly in front of the B pillar after being deployed and a second air chamber configured to be disposed mainly behind the B pillar after being deployed. The collision mode predictor is configured to predict a collision mode of the object with the vehicle. The pressure controller is configured to, based on the collision mode predicted by the collision mode predictor, increase or reduce one of an internal pressure of the first air chamber and an internal pressure of the second air chamber independently of the other internal pressure, or increase or reduce the internal pressure of the first air chamber and the internal pressure of the second air chamber independently of each other.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
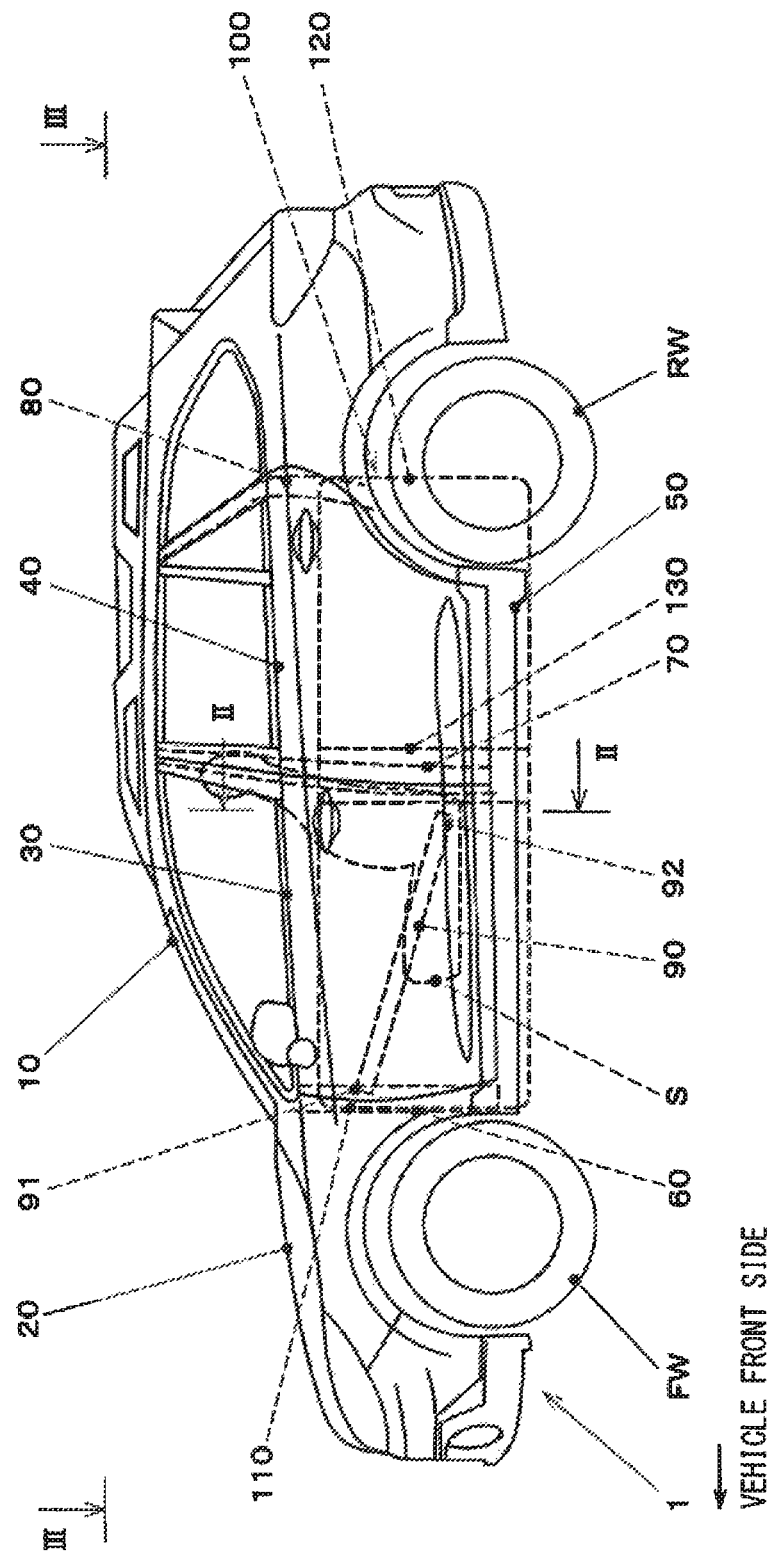
FIG. 1 is a side view of a vehicle including an airbag device according to one example embodiment of the disclosure.

In a side collision in which an object, such as another vehicle, collides from a side of a vehicle, a crash stroke in which energy is absorbable by crush of a vehicle body structure is shorter than in a front collision, which can result in an insufficient amount of energy absorption by the vehicle body structure.

Moreover, in a side collision, a deformation speed at which a door is pushed into a vehicle compartment during the collision can be faster than, a movement speed of a vehicle body, which can cause secondary collision damage to an occupant.

In view of such circumstances, providing a vehicle outside airbag device to be deployed outside a vehicle on a side surface of a vehicle body has been proposed, as in the existing techniques described above. However, a load applied to an airbag is eventually applied to the vehicle body, and energy absorption thus greatly depends on crush of a vehicle body structure.

What is desired is to reduce collision damage to a vehicle and an occupant by obtaining the amount of energy absorption by another method, without depending only on crush of a vehicle body structure.

It is desirable to provide an airbag device that suppresses collision damage upon a side collision.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

First Example Embodiment

A description is given below of an airbag device according to a first example embodiment of the disclosure.

The airbag device according to the first example embodiment may be related to a vehicle, for example, an automobile such as a passenger car, provided with an occupant entry and exit door on a side surface of a vehicle compartment that accommodates an occupant.

FIG. 1 is a side view of the vehicle including the airbag device according to the first example embodiment.

Figure 2:
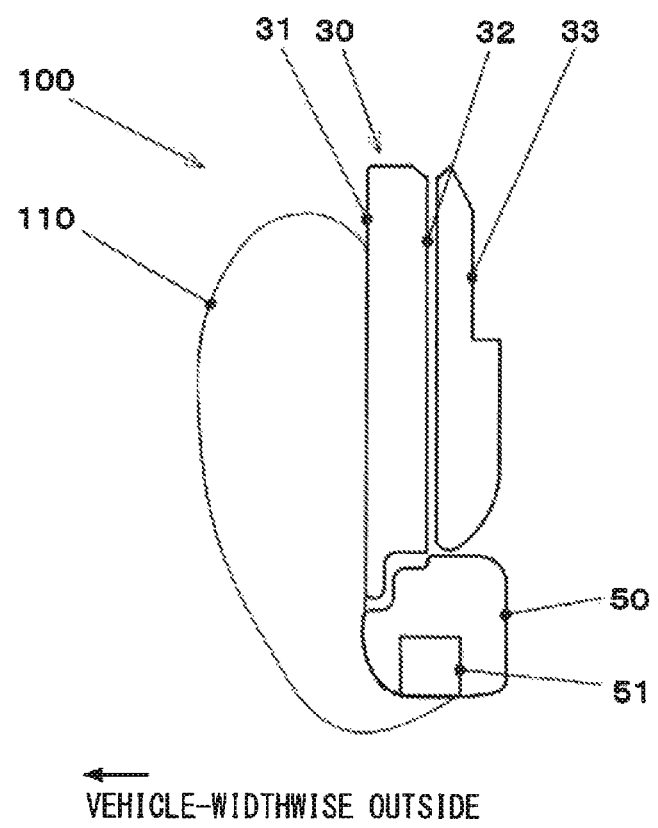
FIG. 2 is a cross-sectional view taken in a direction of arrows II-II illustrated in FIG. 1.

FIG. 2 is a cross-sectional view taken in a direction of arrows II-II illustrated in FIG. 1.

Figure 3:
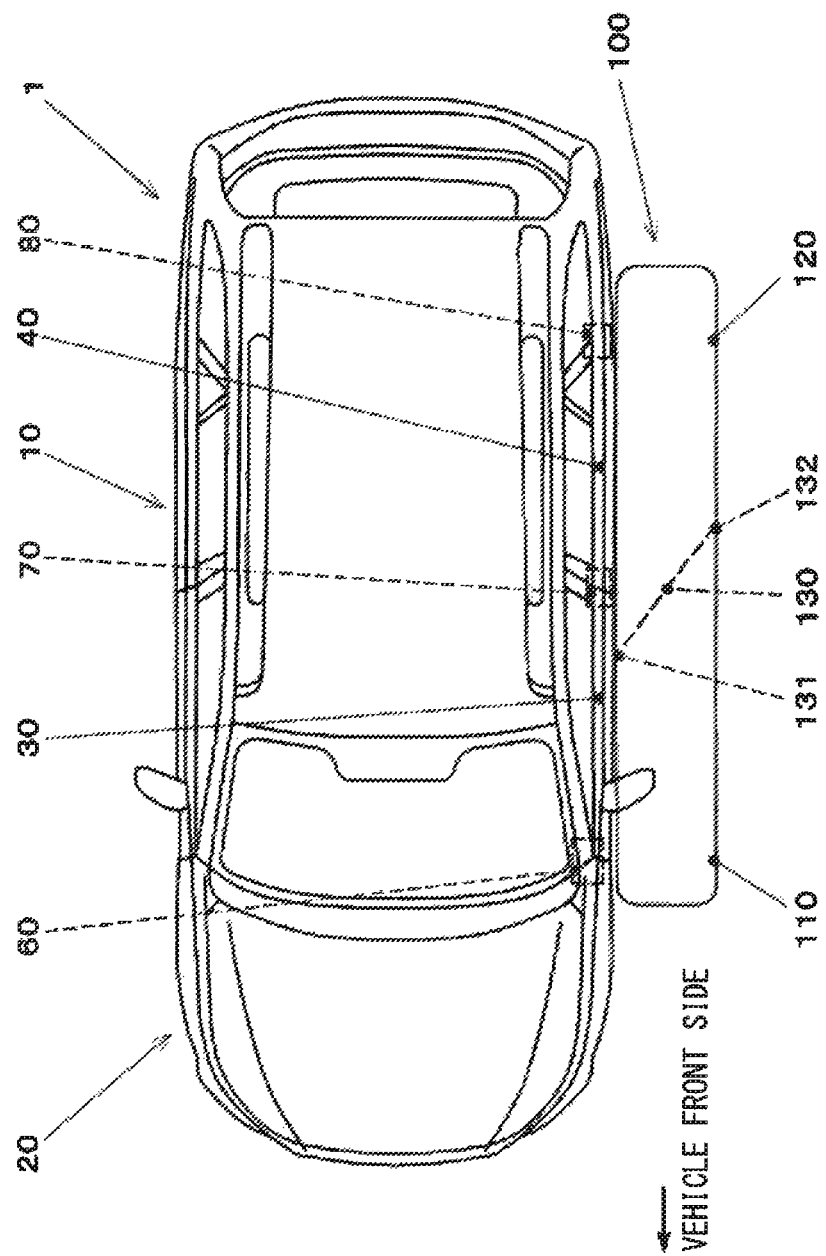
FIG. 3 is a cross-sectional view taken in a direction of arrows III-Ill illustrated in FIG. 1.

FIG. 3 is a cross-sectional view taken in a direction of arrows III-III illustrated in FIG. 1.

In the first example embodiment, a vehicle 1 may be, for example, a passenger car with a so-called two-box vehicle shape that includes a power unit compartment 20 protruding to a front side of a vehicle compartment 10.

The vehicle compartment 10 may have a space that accommodates, for example, an occupant. The vehicle compartment 10 may include, for example, two rows of seats, i.e., front seats and rear seats, arranged in a front-rear direction.

A side surface of the vehicle compartment 10 may be provided with, for example, a front side door 30, a rear side door 40, a side sill 50, an A pillar 60, a B pillar 70, a C pillar 80, and a door beam 90.

The front side door 30 may be a door-shaped body that is used for a front-seat occupant to get in or get out of the vehicle. The front side door 30 may be provided to be openable and closable at a door opening provided on a side of a front seat S in a front part of the vehicle compartment 10.

The front side door 30 may have a front end swingably attached to a rear part of the A pillar 60 via an unillustrated hinge.

The front side door 30 may have a rear end detachably attached to a front part of the B pillar 70 via an unillustrated door catch mechanism.

As illustrated in FIG. 2, the front side door 30 may include, for example, an outer panel 31, an inner panel 32, and a door trim 33.

Although FIG. 2 illustrates cross-sections of the front side door 30 and a first air chamber 110 of an airbag 100, cross-sections of the rear side door 40 and a second air chamber 120 may also have a similar configuration.

The outer panel 31 and the inner panel 32 may each be, for example, a steel plate press-worked into a panel-shaped member.

The outer panel 31 may be a member included in an outer surface, or a design surface, of the vehicle 1.

The inner panel 32 may be disposed on the vehicle-widthwise inside of the outer panel 31.

The outer panel 31 and the inner panel 32 may be joined to each other at outer peripheral edges. In a middle part of the front side door 30, the outer panel 31 and the inner panel 32 may be opposed to each other with a space provided therebetween in a vehicle widthwise direction.

The inner panel 32 may be a frame-shaped member including a steel plate with a larger thickness than the outer panel 31 and having higher strength and bending stiffness than the outer panel 31.

The door trim 33 may be an interior member exposed to the inside of the vehicle compartment 10.

The door trim 33 may be attached to a surface of the inner panel 32 on the vehicle-widthwise inside.

The door trim 33 may include, for example, a resin-based material such as polypropylene (PP).

The rear side door 40 may be a door-shaped body that is used for a rear-seat occupant to get in or get out of the vehicle. The rear side door 40 may be provided to be openable and closable at a door opening provided on a side of an unillustrated rear seat in a rear part of the vehicle compartment 10.

A front edge of the rear side door 40 may be disposed adjacent to a rear edge of the front side door 30 via an inevitably provided space or gap, in a state in which the doors are closed.

The rear side door 40 may have a front end swingably attached to a rear part of the B pillar 70 via an unillustrated hinge.

The rear side door 40 may have a rear end detachably attached to a front part of the C pillar 80 via an unillustrated door catch mechanism.

The side sill 50 may be a vehicle body structural member extending in the front-rear direction of the vehicle, i.e., a vehicle front-rear direction, along lower edges of the front side door 30 and the rear side door 40.

The side sill 50 may be disposed along both ends of an unillustrated floor panel included in a floor surface of the vehicle compartment 10.

The side sill 50 may have a front end disposed adjacent to a rear part of a front wheel house containing a front wheel FW.

The side sill 50 may have a rear end disposed adjacent to a front part of a rear wheel house containing a rear wheel RW.

A lower part of the side sill 50 may be provided with a retainer 51 serving as a container that contains an airbag 100 in an undeployed state and an inflator 211.

The A pillar 60 may be a vehicle body structural member, i.e., a front pillar, provided to protrude upward from the vicinity of the front end of the side sill 50.

A lower part of the A pillar 60 may be disposed along the front end of the front side door 30.

The lower part of the A pillar 60 may be provided with the unillustrated hinge supporting the front side door 30 swingably about an axis extending along a vertical direction.

An upper part of the A pillar 60 may be exposed to be included in the outer surface of a vehicle body of the vehicle, and may be inclined rearward along a side edge of a windshield.

The B pillar 70 may be a vehicle body structural member, i.e., a center pillar, provided to protrude upward from an intermediate part of the side sill 50 in the front-rear direction.

The rear edge of the front side door 30 may be disposed along a front part of the B pillar 70.

The rear end of the front side door 30 may be detachably attached to the B pillar 70 via the unillustrated door catch mechanism.

The front edge of the rear side door 40 may be disposed along a rear part of the B pillar 70.

The rear part of the B pillar 70 may be provided with the unillustrated hinge supporting the rear side door 40 swingably about an axis extending along the vertical direction.

The C pillar 80 may be a vehicle body structural member, i.e., a rear pillar, provided to protrude upward from the vicinity of the rear end of the side sill 50.

A rear edge of the rear side door 40 may be disposed along a front part of the C pillar 80.

The rear end of the rear side door 40 may be detachably attached to the C pillar 80 via the unillustrated door catch mechanism.

The side sill 50, the A pillar 60, the B pillar 70, and the C pillar 80 may be, for example, steel plates press-formed into panels and assembled and joined by spot welding, laser welding, a structural adhesive, etc. to each have a closed section as a cross-section extending along a plane orthogonal to a longitudinal direction.

The door beam 90 may be a member provided inside the front side door 30 and disposed across a front part and a rear part of the front side door 30.

The door beam 90 may include, for example, a circular pipe including a steel material.

A front end 91 and a rear end 92 of the door beam 90 may be attached to the inner panel 32 in the vicinity of the front end and the rear end of the front side door 30.

The door beam 90 may be inclined with respect to a horizontal direction in such a manner that the front end 91 is positioned higher than the rear end 92.

The vehicle 1 may include the airbag 100 configured to be deployed to a region on the vehicle-widthwise outside of the front side door 30 and the rear side door 40, in response to a symptom of a side collision (pre-crash determination).

The airbag 100 may be, for example, base fabric panels including nylon fibers joined to each other into a bag-shaped body by a method such as stitching or fusion.

The airbag 100 may be deployed by receiving a deployment gas introduced from the inflator 211 to be described later.

In normal use of the vehicle, including before pre-crash determination establishment and before airbag deployment, the airbag 100 may be contained in a folded state in the retainer 51 provided in the lower part of the side sill 50.

The retainer 51 may serve as a part where the airbag 100 is attached on a vehicle body side, i.e., a base of the airbag 100, after the airbag 100 is deployed.

As illustrated in FIG. 1 and FIG. 3, the airbag 100 may include the first air chamber 110, the second air chamber 120, and a partition 130.

The first air chamber 110 may be a part included in a front part of the airbag 100.

The second air chamber 120 may be a part included in a rear part of the airbag 100.

The partition 130 may be provided inside the airbag 100 to separate the first air chamber 110 and the second air chamber 120.

The first air chamber 110 may have a front end provided in front of the A pillar 60.

The first air chamber 110 may have a rear end provided in the vicinity of the B pillar 70.

The second air chamber 120 may have a front end continuous with the rear end of the first air chamber 110 in the vicinity of the B pillar 70.

The second air chamber 120 may have a rear end provided behind the C pillar 80.

An upper end of the first air chamber 110 may be disposed to be positioned above an upper end of the door beam 90, in a region from a front end to a rear end of a seating surface of the seat S in the vehicle front-rear direction. Note that such a positional relationship may hold, for example, in the entire region of a front-rear sliding range of the seat S.

An upper end of the second air chamber 120 may be disposed to be positioned above an unillustrated rear door beam provided inside the rear side door 40, in a region from a front end to a rear end of a seating surface of an unillustrated rear seat.

As illustrated in FIG. 3, in plan view as viewed from above the vehicle 1, the partition 130 may be inclined with respect to the vehicle widthwise direction in such a manner that its end 131 on the vehicle-widthwise inside is on a vehicle front side with respect to its end 132 on the vehicle-widthwise outside.

The end 131 may be disposed on the vehicle front side, i.e., the A pillar 60 side, with respect to the B pillar 70.

The end 132 may be disposed on a vehicle rear side, i.e., the C pillar 80 side, with respect to the B pillar 70.

With such a configuration, a portion of the first air chamber 110 on the rear side, a portion of the second air chamber 120 on the front side, and the B pillar 70 may be disposed to overlap with each other as viewed in the vehicle widthwise direction.

The first air chamber 110 may be configured to transmit a load applied from an object such as another vehicle V to, for example, the front side door 30, the A pillar 60, the B pillar 70, and the side sill 50 in a distributed manner.

The second air chamber 120 may be configured to transmit a load applied from an object such as the other vehicle V to, for example, the rear side door 40, the B pillar 70, the C pillar 80, and the side sill 50 in a distributed manner.

Figure 4:
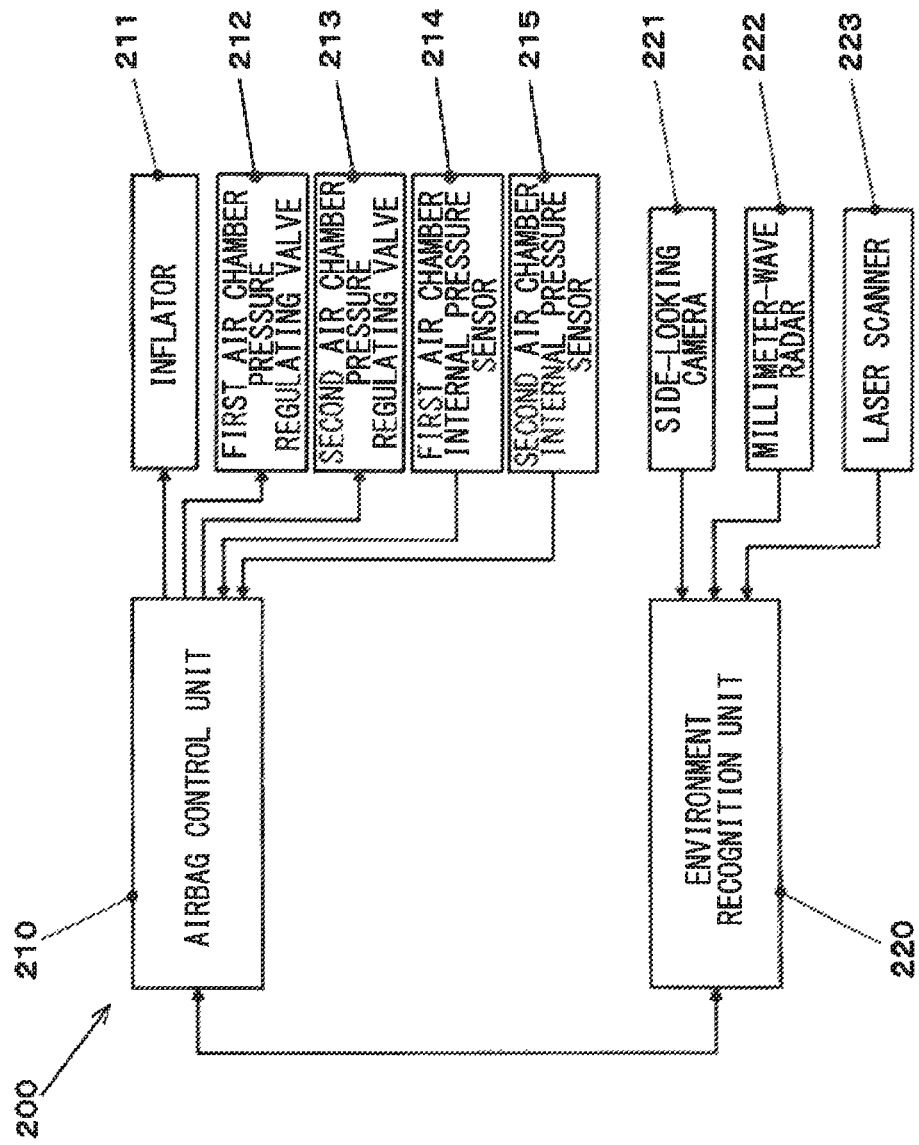
FIG. 4 is a diagram illustrating a configuration of a control system for an airbag in the airbag device according to one example embodiment.

FIG. 4 is a diagram illustrating a configuration of a control system for the airbag in the airbag device according to the first example embodiment.

A control system 200 may include, for example, an airbag control unit 210 and an environment recognition unit 220.

The airbag control unit 210 and the environment recognition unit 220 may each include a microcomputer including, for example, a data processor, a storage, an input/output interface, and a bus. The data processor may be a central processing unit (CPU). The storage may be a random-access memory (RAM) or a read-only memory (ROM). The bus may couple the data processor, the storage, and the input/output interface together.

The airbag control unit 210 and the environment recognition unit 220 may be communicably coupled to each other, for example, directly or via an in-vehicle local area network (LAN) such as a controller area network (CAN) communication system.

The airbag control unit 210 may control a deployment state of the airbag 100 and internal pressures of the respective air chambers in a deployed state.

The airbag control unit 210 may be coupled to, for example, the inflator 211, a first air chamber pressure regulating valve 212, a second air chamber pressure regulating valve 213, a first air chamber internal pressure sensor 214, and a second air chamber internal pressure sensor 215.

The inflator 211 may be a gas generator that deploys the airbag 100 by supplying the deployment gas to each of the first air chamber 110 and the second air chamber 120 of the airbag 100.

The inflator 211 may be configured to generate the deployment gas, for example, by causing a chemical to react in response to a deployment signal.

The inflator 211 may have a configuration including multiple gas generators that supply the deployment gas independently to the first air chamber 110 and the second air chamber 120 of the airbag 100.

In another example, the inflator 211 may be a multistage inflator that is able to generate the deployment gas multiple times at time intervals, on an as-needed basis.

The first air chamber pressure regulating valve 212 and the second air chamber pressure regulating valve 213 may be provided in the first air chamber 110 and the second air chamber 120, respectively. The first air chamber pressure regulating valve 212 and the second air chamber pressure regulating valve 213 may each be a control valve such as an electromagnetic valve that adjusts the internal pressure of the corresponding air chamber.

The first air chamber pressure regulating valve 212 and the second air chamber pressure regulating valve 213 may each be configured to be normally kept in a closed state, and to open in response to a command from the airbag control unit 210, and release a portion of the deployment gas inside the corresponding air chamber to the outside to reduce the internal pressure of the air chamber.

The first air chamber internal pressure sensor 214 and the second air chamber internal pressure sensor 215 may be pressure sensors that detect the internal pressures of the first air chamber 110 and the second air chamber 120. The internal pressure may be a pressure of the deployment gas.

Outputs of the first air chamber internal pressure sensor 214 and the second air chamber internal pressure sensor 215 may be transmitted to the airbag control unit 210.

In airbag deployment control to be described later, the airbag control unit 210 may perform feedback control on the first air chamber pressure regulating valve 212 and the second air chamber pressure regulating valve 213 in such a manner that the internal pressures of the first air chamber 110 and the second air chamber 120 detected by the first air chamber internal pressure sensor 214 and the second air chamber internal pressure sensor 215 are set to predetermined target pressures.

The airbag control unit 210 may cooperate with the pressure regulating valves and the internal pressure sensors to serve as a "pressure controller" in one embodiment.

The environment recognition unit 220 may recognize a surrounding environment including a side of the vehicle 1, i.e., the own vehicle, on the basis of outputs of various sensors.

In one embodiment, the environment recognition unit 220 may serve as a "collision mode predictor".

The environment recognition unit 220 may be coupled to the sensors, for example, a side-looking camera 221, a millimeter-wave radar 222, and a laser scanner 223.

The side-looking camera 221 may include, for example, a solid-state image sensor such as a complementary metal oxide semiconductor (CMOS) or a charge-coupled device (CCD), an imaging optical system such as a lens group, and an image processor. The side-looking camera 221 may sequentially acquire images within an imaging range, i.e., an angle of view, including the side of the own vehicle.

The millimeter-wave radar 222 may be a radar that uses radio waves in a frequency band of, for example, 30 to 300 GHz. The millimeter-wave radar 222 may be configured to detect presence or absence of an object and a relative position of the object with respect to the vehicle 1.

The laser scanner 223 may be a light detection and ranging (LiDAR). The laser scanner 223 may be configured to irradiate surroundings of the vehicle 1 with, for example, pulsed near-infrared laser light to scan the surroundings. The laser scanner 223 may thereby detect, for example, presence or absence of an object, a relative position of the object with respect to the vehicle 1, and a shape of the object, on the basis of presence or absence of reflected light and a time difference between irradiation with the laser light and returning of reflected light.

For example, in a case where a side collision with an object such as another vehicle V is unavoidable, i.e., a case where side impact pre-crash determination is established, the environment recognition unit 220 may be able to recognize a form of the collision with the object and an attribute of the object. The form of the collision with the object may be, for example, a speed vector of the object with respect to the vehicle 1 or a position where the object collides with the vehicle 1, The attribute of the object may be, for example, a vehicle type, a vehicle shape, or a size in a case where the object is a vehicle.

In the first example embodiment, the airbag 100 is deployed in response to establishment of side impact pre-crash determination, and the internal pressures of the first air chamber 110 and the second air chamber 120 are controlled independently depending on a predicted collision mode.

Such control of the airbag 100 is described below.

Figure 5:
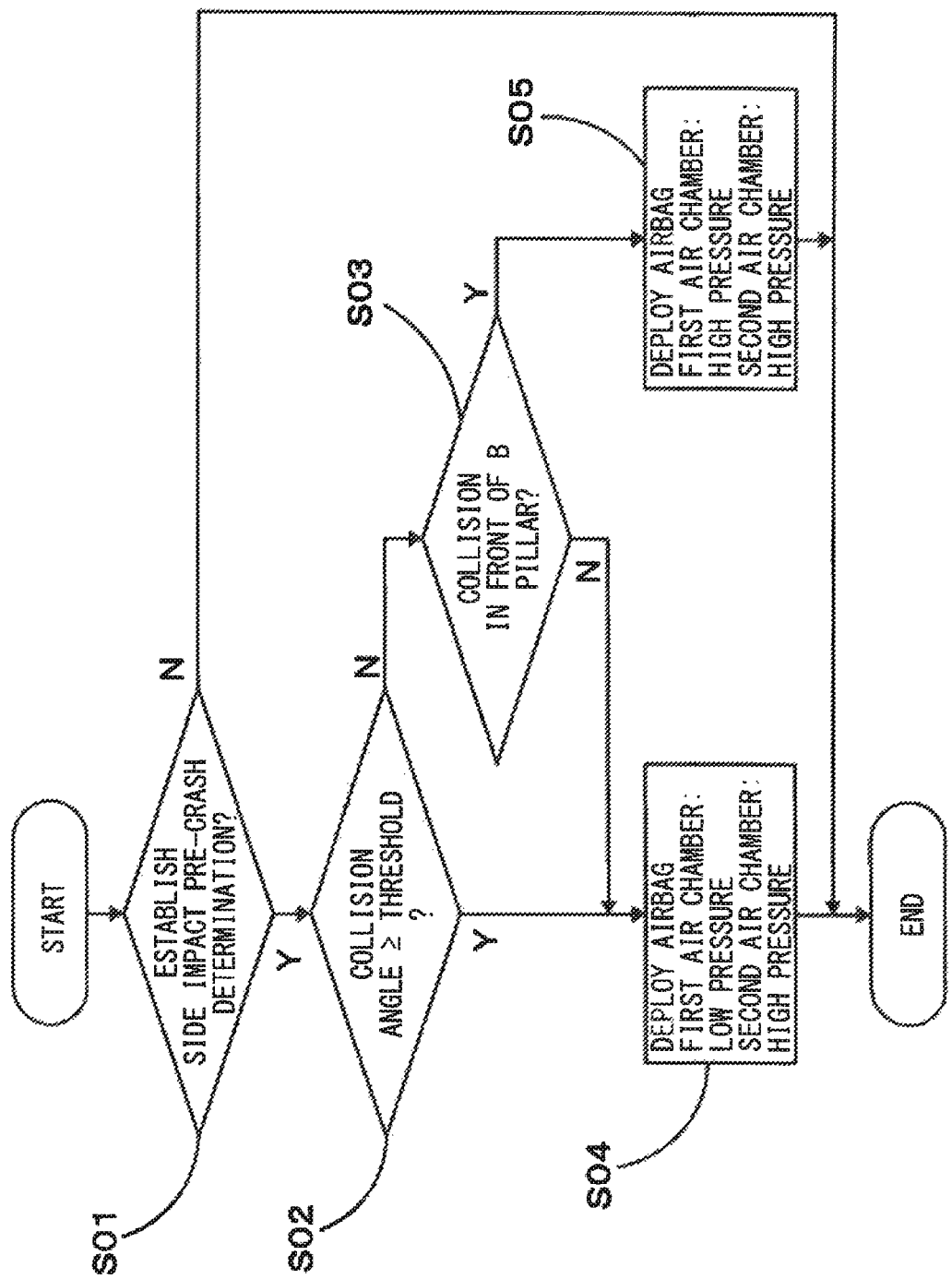
FIG. 5 is a flowchart illustrating an overview of airbag deployment control in the airbag device according to one example embodiment.

FIG. 5 is a flowchart illustrating an overview of the airbag deployment control in the airbag device according to the first example embodiment.

The flow is described below in order of step.

[Step S01: Side Impact Pre-Crash Determination Establishment]

The environment recognition unit 220 may determine, on the basis of the outputs of the sensors, whether collision of an object such as the other vehicle V on a side surface of the vehicle 1 from a diagonal front side is unavoidable.

If the environment recognition unit 220 determines that the collision is unavoidable (step S01: Y), the environment recognition unit 220 may establish side impact pre-crash determination, and the flow may proceed to step S02. Otherwise (step S01: N), the series of processes may be ended.

[Step S02: Determination of Collision Angle]

The environment recognition unit 220 may estimate a collision angle θ (see FIG. 6 to FIG. 8 to be described later) immediately before the object such as the other vehicle V collides with the vehicle 1, and compare the estimated collision angle θ with a preset threshold θth.

According to some embodiments described in the present specification, the appended claims, etc., a collision angle may refer to an angle, in plan view as viewed from above, formed by a straight line extending along the front-rear direction of the own vehicle and a straight line extending along a relative movement direction, with respect to the own vehicle, of an object that comes into collision. The collision angle may be equal to or greater than 0° and less than 90°.

If the collision angle θ is the threshold θth or greater (step S02: Y), the flow may proceed to step S04, Otherwise (step S02: N), the flow may proceed to step S03.

[Step S03: Determination of Collision Position]

The environment recognition unit 220 may estimate a position where the other vehicle V collides with the airbag 100, and determine whether the position (hereinafter referred to as a "collision position") is, in the vehicle front-rear direction, in front of the B pillar 70. The collision position may typically be a center position of a load F applied to the airbag 100 by the collision.

If the collision position is in front of the B pillar 70 (step S03: Y), the flow may proceed to step SOS. Otherwise, i.e., if the collision position is in a region including the B pillar 70 or further behind the B pillar 70 (step S03: N), the flow may proceed to step S04.

[Step S04: Airbag Deployment (Low Pressure on Front Side and High Pressure on Rear Side)]

The airbag control unit 210 may activate the inflator 211 to generate the deployment gas and supply the deployment gas to the first air chamber 110 and the second air chamber 120, to thereby feed and deploy the airbag 100 from the retainer 51.

At this time, the internal pressure of the first air chamber 110 may be set to a lower pressure than the internal pressure of the second air chamber 120 to allow the first air chamber 110 to have a relatively low pressure and the second air chamber 120 to have a relatively high pressure.

In this case, the second air chamber 120 may not be subjected to pressure reduction by the second air chamber pressure regulating valve 213.

For the first air chamber 110, the first air chamber pressure regulating valve 212 may be kept in an open state at a predetermined opening degree.

Thus, upon receiving the load applied by the collision, the first air chamber 110 is able to contract while exhausting the internal deployment gas from the first air chamber pressure regulating valve 212 to absorb energy.

Thereafter, the series of processes may be ended and the flow may return.

[Step S05: Airbag Deployment (Equal Pressures on Front and Rear Sides)]

The airbag control unit 210 may activate the inflator 211 to generate the deployment gas and supply the deployment gas to the first air chamber 110 and the second air chamber 120, to thereby feed and deploy the airbag 100 from the retainer 51.

At this time, the internal pressures of the first air chamber 110 and the second air chamber 120 may be set to a high pressure equal to the internal pressure of the second air chamber 120 in step S04.

In this case, the first air chamber 110 and the second air chamber 120 may not be subjected to pressure reduction by the first air chamber pressure regulating valve 212 and the second air chamber pressure regulating valve 213.

Thereafter, the series of processes may be ended and the flow may return.

Described below are a state and example effects after a side collision in the vehicle including the airbag device according to the first example embodiment.

Figure 6:
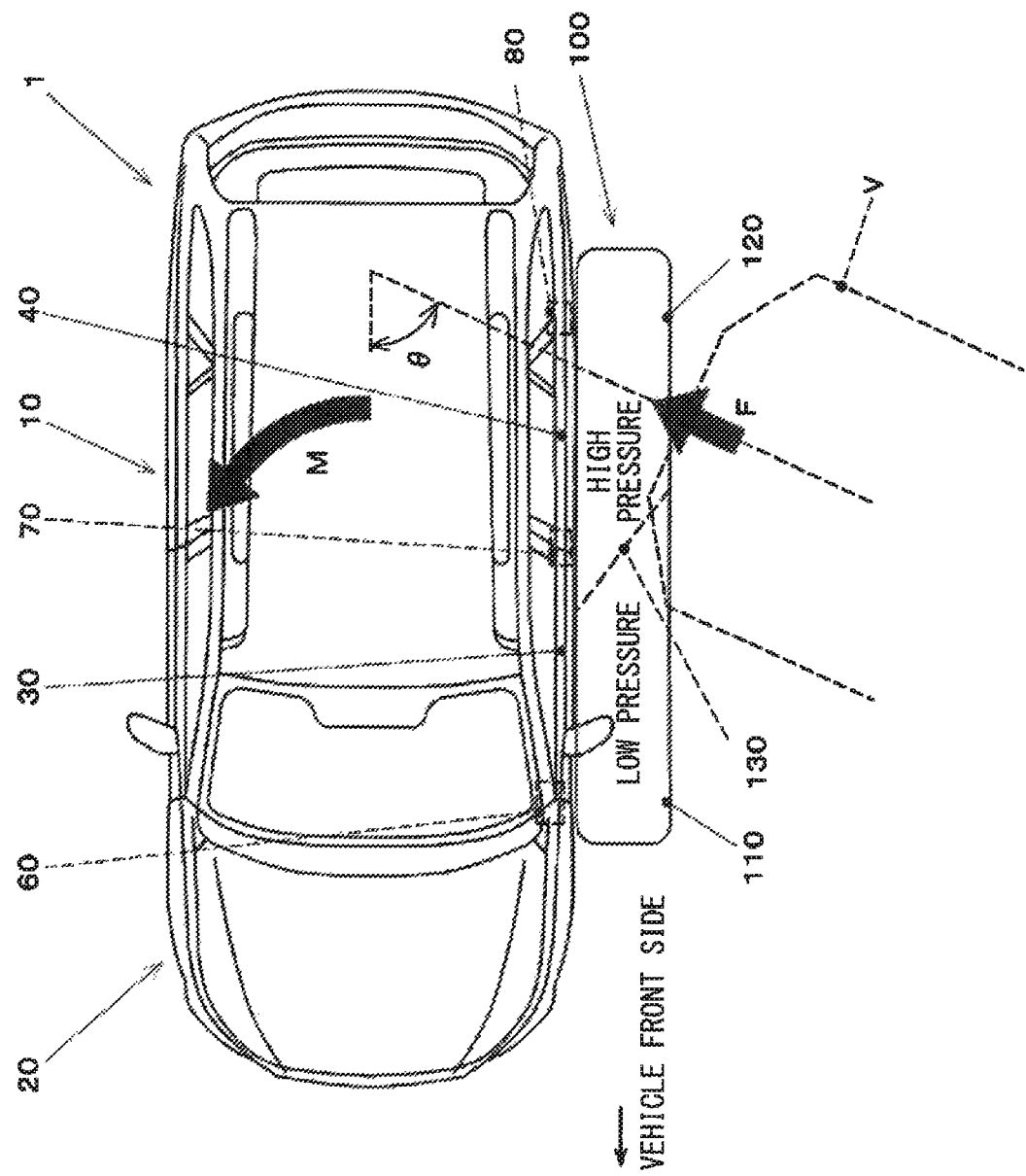
FIG. 6 is a schematic view of a state immediately after collision of the vehicle including the airbag device according to one example embodiment, and illustrates a state in which a region behind a B pillar is subjected to a side collision at a large collision angle.

FIG. 6 is a schematic view of a state immediately after collision of the vehicle including the airbag device according to the first example embodiment, and illustrates a state in which a region behind the B pillar is subjected to a side collision at a large collision angle.

In this case, the first air chamber 110 may be made to have a lower pressure than the second air chamber 120 (step S04).

The other vehicle V may collide mainly with the second air chamber 120 from the diagonal front side at a collision angle θ greater than the predetermined threshold θth, and transmit the load F to, for example, the rear side door 40, the B pillar 70, the C pillar 80, and the side sill 50 via the second air chamber 120.

This generates, on the vehicle 1, a moment M that causes a rear part of the vehicle body to swing to a side opposite to a collision side. The side opposite to the collision side may be, for example, a right side because the vehicle 1 is subjected to the collision from a left side in FIG. 6.

The moment M may cause the vehicle 1 to exhibit a yaw behavior in a spin mode around the vicinity of the power unit compartment 20 carrying a heavy object.

Energy applied to the vehicle body by the collision may partly be consumed by being converted into kinetic energy caused by such a yaw behavior and frictional energy caused by tire slip. This reduces the energy to be absorbed by, for example, crush of the vehicle body, suppressing damage to and deformation of the vehicle compartment 10.

In addition, setting the internal pressure of the first air chamber 110 to a lower pressure than the internal pressure of the second air chamber 120 makes it possible to suppress attack from the first air chamber 110 to the vehicle body.

Figure 7:
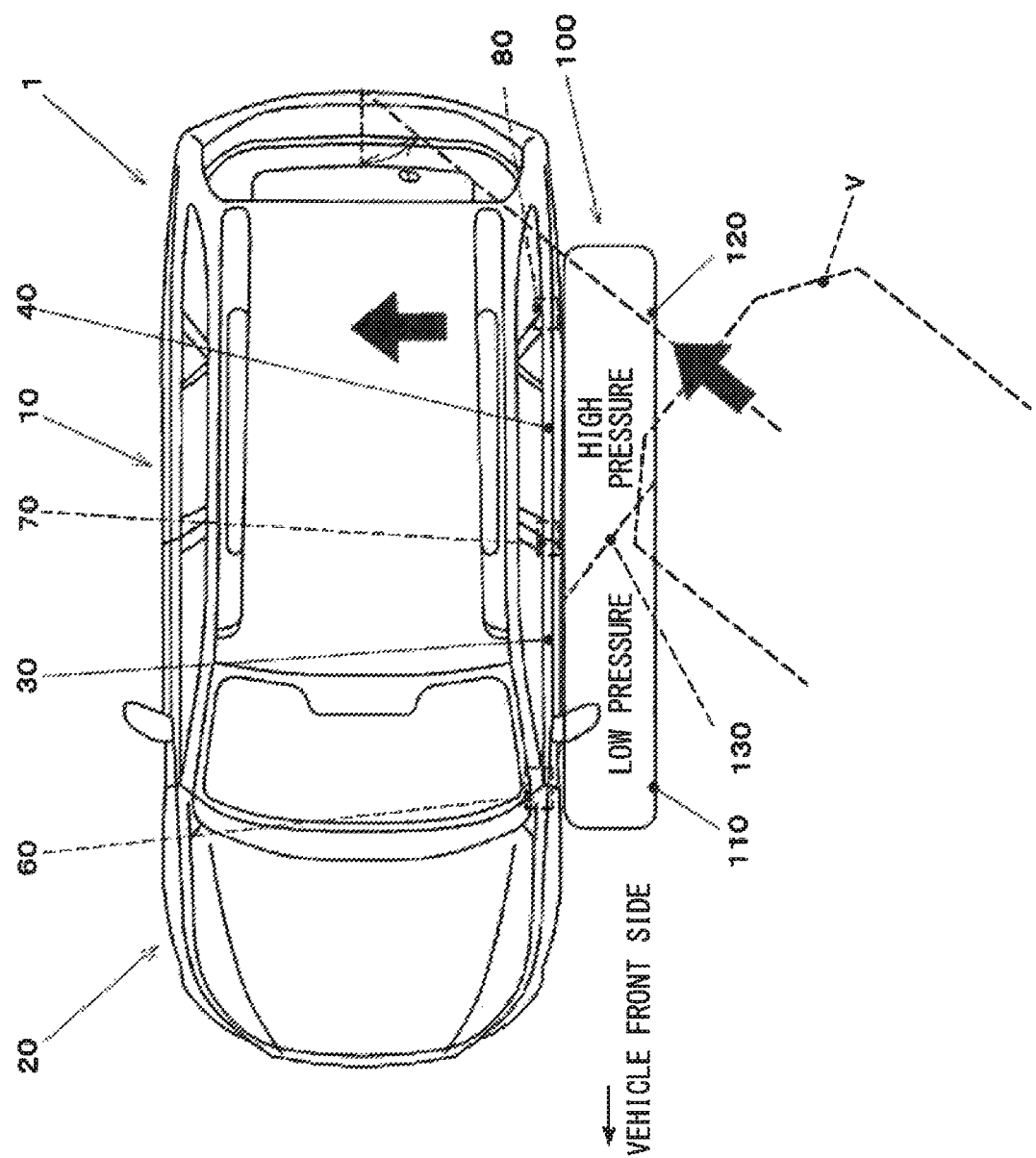
FIG. 7 is a schematic view of a state immediately after collision of the vehicle including the airbag device according to one example embodiment, and illustrates a state in which a region behind the B pillar is subjected to a side collision at a small collision angle.

FIG. 7 is a schematic view of a state immediately after collision of the vehicle including the airbag device according to the first example embodiment, and illustrates a state in which a region behind the B pillar is subjected to a side collision at a small collision angle.

In this case, the first air chamber 110 may be made to have a lower pressure than the second air chamber 120 (step S04).

The other vehicle V may collide mainly with the second air chamber 120 from the diagonal front side at a collision angle θ less than the predetermined threshold θth, and transmit the load F to, for example, the rear side door 40, the B pillar 70, the C pillar 80, and the side sill 50 via the second air chamber 120.

This may cause the vehicle 1 to exhibit a behavior in which the vehicle body makes a translational motion to the side opposite to the collision side in the vehicle widthwise direction. The translational motion may typically be side slip.

Energy applied to the vehicle body by the collision may partly be consumed by being converted into kinetic energy caused by such a lateral translational motion of the vehicle body and frictional energy caused by tire slip. This reduces the energy to be absorbed by, for example, crush of the vehicle body, suppressing damage to and deformation of the vehicle compartment 10.

In addition, setting the internal pressure of the first air chamber 110 to a lower pressure than the internal pressure of the second air chamber 120 makes it possible to suppress attack from the first air chamber 110 to the vehicle body.

Figure 8:
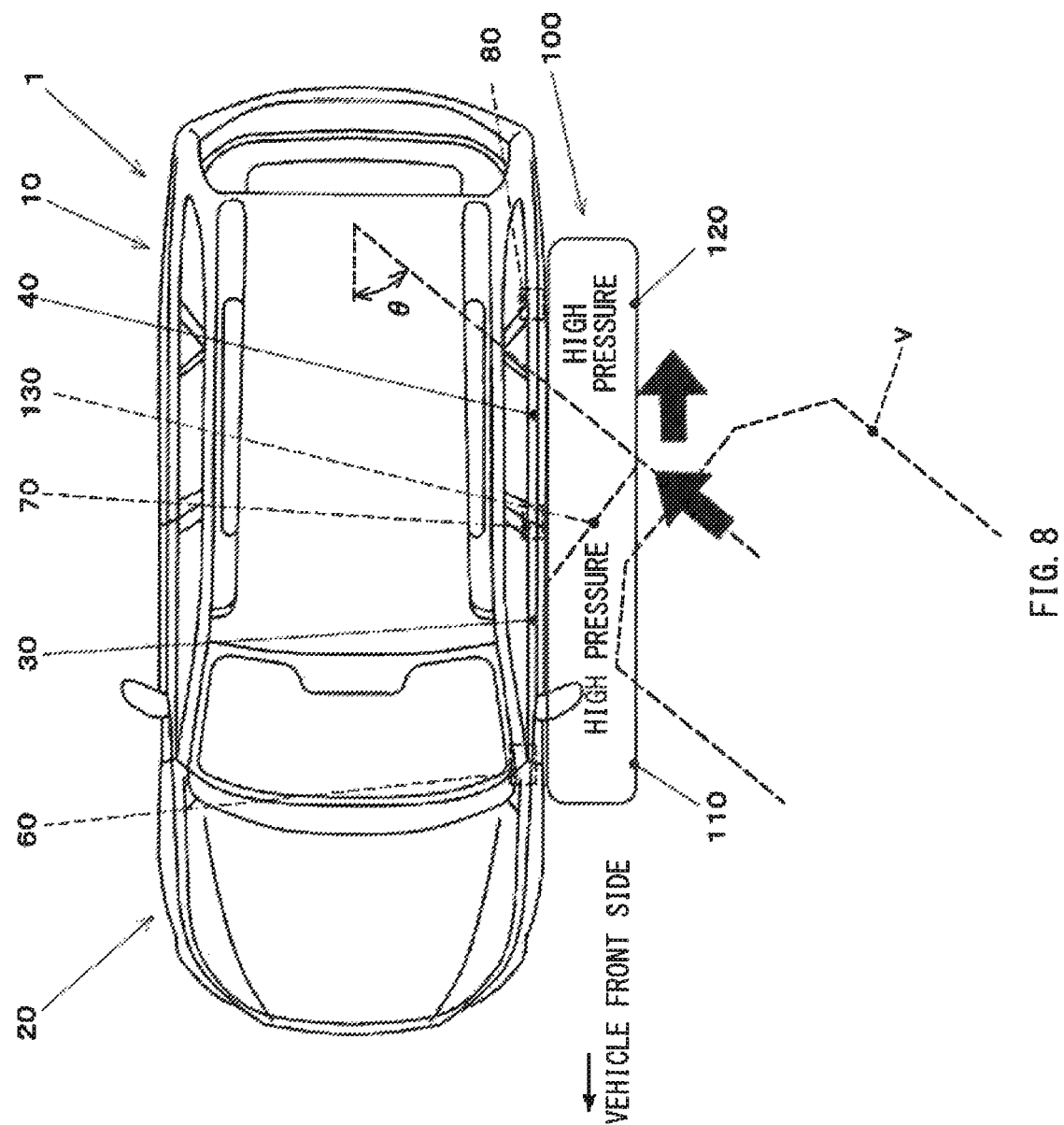
FIG. 8 is a schematic view of a state immediately after collision of the vehicle including the airbag device according to one example embodiment, and illustrates a state in which a region in front of the B pillar is subjected to a side collision at a small collision angle.

FIG. 8 is a schematic view of a state immediately after collision of the vehicle including the airbag device according to the first example embodiment, and illustrates a state in which a region in front of the B pillar is subjected to a side collision at a small collision angle.

In this case, the first air chamber 110 and the second air chamber 120 may be made to have equal pressures, e.g., equal high pressures (step S05).

The other vehicle V may collide mainly with the first air chamber 110 from the diagonal front side at a collision angle θ less, or shallower, than the predetermined threshold θth.

At this time, a front end of the other vehicle V may slip to the rear side of the vehicle 1 sequentially along surfaces of the first air chamber 110 and the second air chamber 120 on the vehicle-widthwise outside, and a traveling direction of the other vehicle V may thus change to a direction in which the other vehicle V passes the vehicle 1.

In this case, the load F transmitted from the airbag 100 to the vehicle 1 may be received by, for example, the A pillar 60, the B pillar 70, and the C pillar 80.

Causing the other vehicle V to exhibit a behavior of passing the vehicle 1 makes it possible to suppress direct collision between the other vehicle V and the vehicle body of the vehicle 1, and reduce energy applied from the other vehicle V to the vehicle body of the vehicle 1. This reduces the energy to be absorbed by, for example, crush of the vehicle body, suppressing damage to and deformation of the vehicle compartment 10.

According to the first example embodiment described above, it is possible to achieve the following example effects.

(1) The internal pressure of the first air chamber 110 and the internal pressure of the second air chamber 120 are controlled independently depending on the collision mode of an object such as the other vehicle V with the vehicle 1. Thus, a form of load application from the object such as the other vehicle V to the vehicle body may be controlled to cause one or both of the vehicle body and the object to exhibit a behavior that reduces collision damage. This makes it possible to consume a portion of the energy caused by the collision as kinetic energy, thereby reducing the energy absorbed by, for example, crush of the vehicle body. This helps to suppress damage to and deformation of the vehicle body to keep survival space for an occupant.

(2) In a case where a side collision at the collision angle θ equal to or greater than the threshold θth with a region including the B pillar 70 on the side surface of the vehicle body is predicted, the internal pressure of the second air chamber 120 may be set to a higher pressure than the internal pressure of the first air chamber 110. This promotes load transmission from the second air chamber 120 to a region of the vehicle body behind the B pillar 70, causing a yaw behavior, typically a behavior in the spin mode, in which the rear part of the vehicle body swings to the side opposite to the collision side. This makes it possible to convert a portion of the energy applied by the collision into kinetic energy of the vehicle body and frictional energy caused by tire slip, and consume the energy.

In addition, setting the internal pressure of the first air chamber 110 to a lower pressure than the internal pressure of the second air chamber 120 makes it possible to suppress attack to a front half part of the vehicle body, reducing damage to and deformation of the vehicle body.

For example, it is possible to suppress deformation of the front side door 30 resulting in entry into the vehicle compartment 10 beyond the side sill 50.

(3) In a case where a collision from the diagonal front side at the collision angle θ less than the threshold θth with a region in front of the B pillar 70 on the side surface of the vehicle body is predicted, the internal pressure of the first air chamber 110 may be set to a high pressure equal to the internal pressure of the second air chamber 120. This makes it possible to slide the object such as the other vehicle V to the rear side of the vehicle 1 along a surface of the airbag 100, by using strength of, for example, the B pillar 70 of the vehicle body as reaction force, to guide the object such as the other vehicle V to pass the vehicle 1. This makes it possible to prevent the vehicle body of the vehicle 1 and the object such as the other vehicle V from coming into direct collision.

(4) In a case where a collision from the diagonal front side at the collision angle θ less than the threshold θth with a region behind the B pillar 70 on the side surface of the vehicle body is predicted, the internal pressure of the second air chamber 120 may be set to a higher pressure than the internal pressure of the first air chamber 110. This makes it possible to convert torsional load application to the B pillar 70 into compressive load application, and transmit the load applied by the collision to the B pillar 70 and the C pillar 80 in a distributed manner, to cause a behavior, typically a side slip behavior, of the vehicle 1 being pushed out laterally by the object such as the other vehicle V. This makes it possible to convert a portion of the energy applied by the collision into kinetic energy of the vehicle body and frictional energy caused by tire slip, and consume the energy.

In addition, setting the internal pressure of the first air chamber 110 to a lower pressure than the internal pressure of the second air chamber 120 makes it possible to suppress attack to the front half part of the vehicle body, reducing damage to and deformation of the vehicle body. This also helps to prevent inhibition of deformation of the second air chamber 120 being compressed to be elongated in the front-rear direction, making it possible to transmit the load more effectively from the second air chamber 120 to the B pillar 70.

(5) The partition 130 between the first air chamber 110 and the second air chamber 120 may be inclined with respect to the vehicle widthwise direction to allow a rear part of the first air chamber 110 and a front part of the second air chamber 120 to overlap with the B pillar 70 as viewed in the vehicle widthwise direction. This makes it possible to effectively transmit the load from both the first air chamber 110 and the second air chamber 120 to the B pillar 70.

Second Example Embodiment

A description is given next of an airbag device according to a second example embodiment of the disclosure.

In example embodiments described below, portions common to those in the foregoing example embodiment are denoted with the same reference numerals to avoid repetitive description, and differences will mainly be described.

Figure 9:
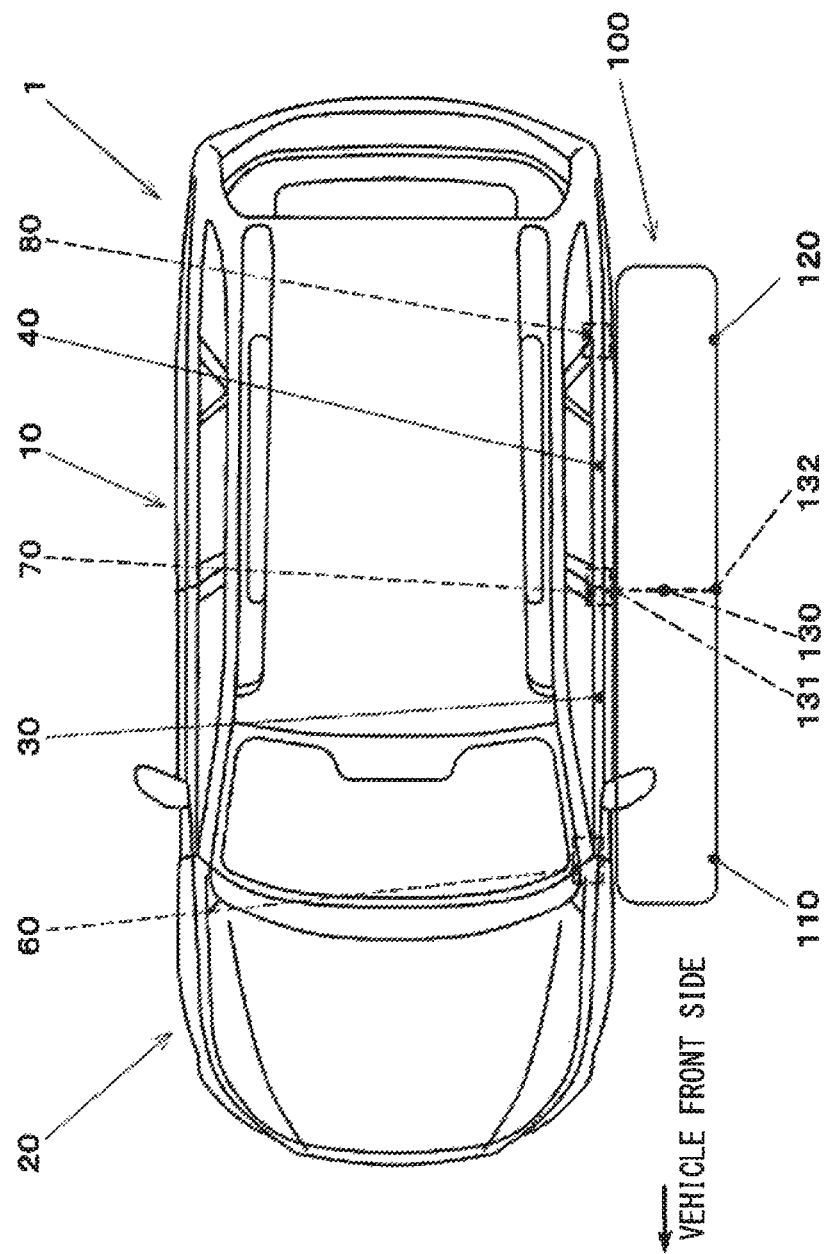
FIG. 9 is a plan view of a vehicle including an airbag device according to one example embodiment of the disclosure as viewed from above the vehicle.

As illustrated in FIG. 9, in the airbag device according to the second example embodiment, the partition 130 separating the first air chamber 110 and the second air chamber 120 may be disposed along the vehicle widthwise direction in plan view as viewed from above the vehicle.

The partition 130 may be positioned, in the vehicle front-rear direction, to overlap with an intermediate part of the B pillar 70 in the vehicle front-rear direction.

Also in the second example embodiment described above, it is possible to achieve example effects similar to those of the first example embodiment described above, excluding the example effect described in the item (5).

Third Example Embodiment

A description is given next of an airbag device according to a third example embodiment of the disclosure.

In the airbag device according to the third example embodiment, the first air chamber 110 and the second air chamber 120 of the deployed airbag 100 may be movable in the front-rear direction with respect to the vehicle body by using a front-rear movement mechanism 300 described below.

The front-rear movement mechanism 300 may cooperate with the airbag control unit 210 to serve as an "airbag mover" in one embodiment.

Figure 10:
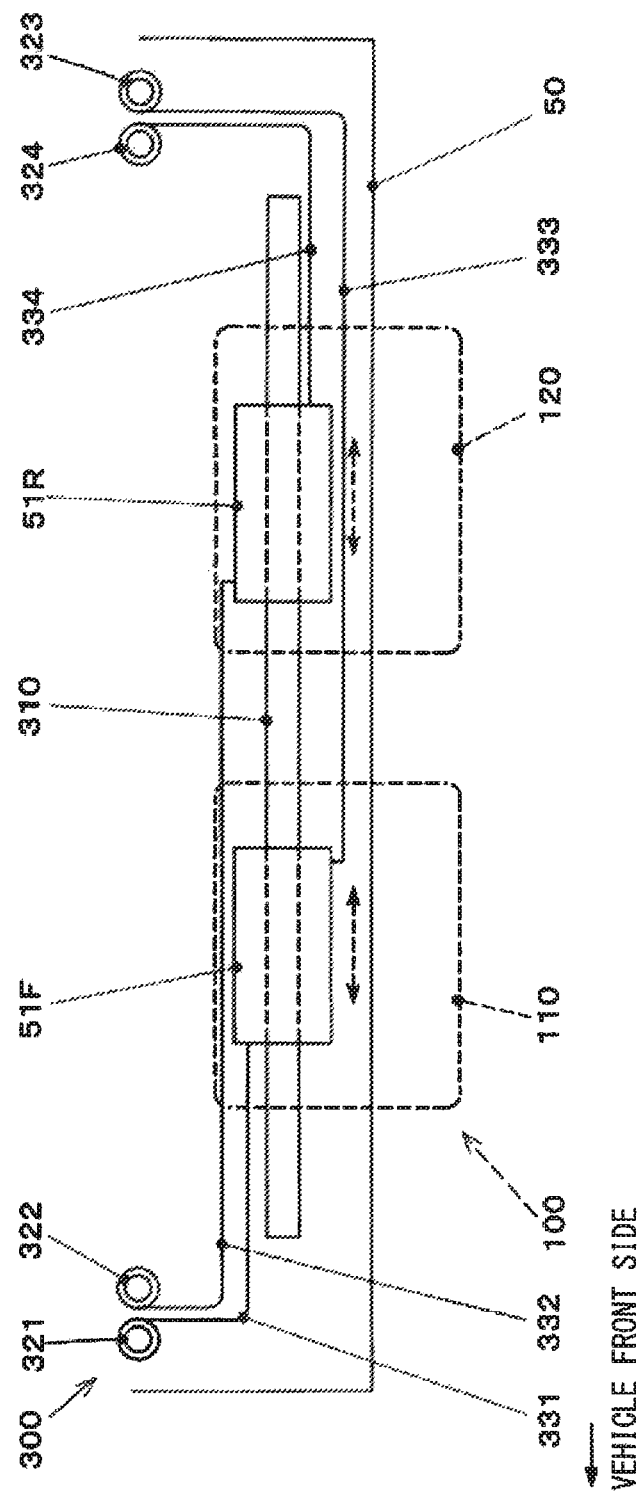
FIG. 10 is a schematic view of a configuration of a front-rear movement mechanism for a first air chamber and a second air chamber in an airbag device according to one example embodiment of the disclosure.

FIG. 10 is a schematic view of a configuration of the front-rear movement mechanism 300 for the first air chamber 110 and the second air chamber 120 in the airbag device according to the third example embodiment.

In the third example embodiment, the retainer 51 may be divided into a front retainer 51F and a rear retainer 51R.

The first air chamber 110 and the second air chamber 120 may be independent bags, and each air chamber may be provided with the corresponding inflator 211.

Before establishment of pre-crash determination for the vehicle 1, the first air chamber 110 and the second air chamber 120 may be contained in a folded state in the front retainer 51F and the rear retainer 51R, respectively.

The front-rear movement mechanism 300 may include, for example, a rail 310, pulleys 321 to 324, and wires 331 to 334.

The rail 310 may be a guide member provided inside the side sill 50 and disposed along the longitudinal direction of the side sill 50, i.e., the vehicle front-rear direction.

The front retainer 51F and the rear retainer 51R may be supported by the rail 310 to be displaceable along a longitudinal direction of the rail 310 with respect to the side sill 50.

The pulley 321 may be provided in the vicinity of the front end of the side sill 50, and coupled to the front retainer 51F via the wire 331.

The pulley 321 may be configured to pull the front retainer 51F to the vehicle front side by winding the wire 331.

The pulley 322 may be provided in the vicinity of the front end of the side sill 50, and coupled to the rear retainer 51R via the wire 332.

The pulley 322 may be configured to pull the rear retainer 51R to the vehicle front side by winding the wire 332.

The pulley 323 may be provided in the vicinity of the rear end of the side sill 50, and coupled to the front retainer 51F via the wire 333.

The pulley 323 may be configured to pull the front retainer 51F to the vehicle rear side by winding the wire 333.

The pulley 324 may be provided in the vicinity of the rear end of the side sill 50, and coupled to the rear retainer 51R via the wire 334.

The pulley 324 may be configured to pull the rear retainer 51R to the vehicle rear side by winding the wire 334.

The pulleys 321 to 324 may each be provided with an actuator, such as an electric motor, to be used to wind the corresponding wire.

The actuators may be controlled in response to a command from the airbag control unit 210.

A description is given below of airbag deployment control and front-rear direction drive control in the third example embodiment.

Figure 11:
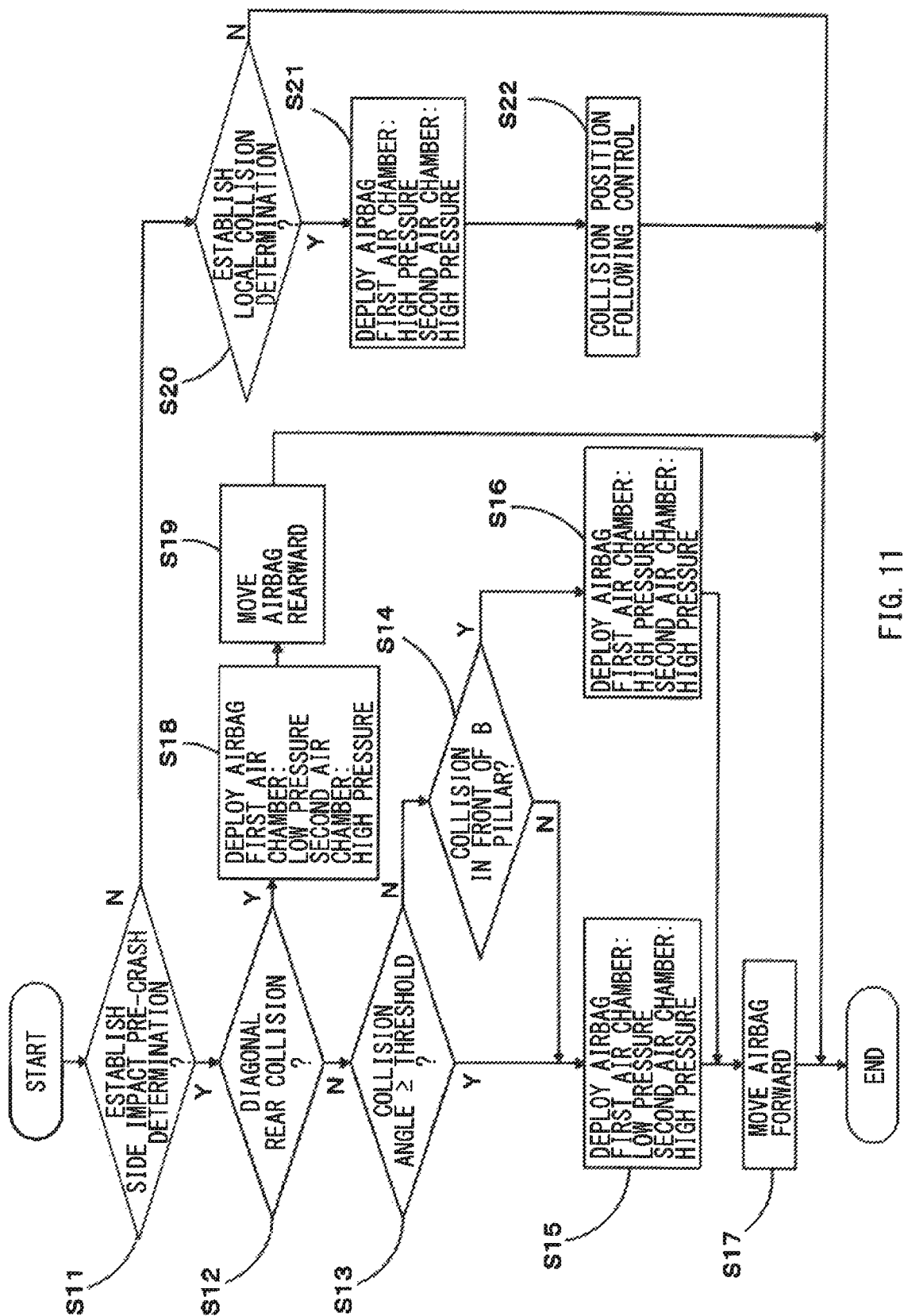
FIG. 11 is a flowchart illustrating an overview of airbag deployment control in the airbag device according to one example embodiment.

FIG. 11 is a flowchart illustrating an overview of the airbag deployment control in the airbag device according to the third example embodiment.

The flow is described below in order of step.
[Step S11: Side Impact Pre-Crash Determination Establishment]

The environment recognition unit 220 may determine, on the basis of the outputs of the sensors, whether collision of an object such as the other vehicle V on the side surface of the vehicle 1 from the diagonal front side or a diagonal rear side is unavoidable.

If the environment recognition unit 220 determines that the collision is unavoidable (step S11: Y), the environment recognition unit 220 may establish side impact pre-crash determination, and the flow may proceed to step S12. Otherwise (step S11: N), the flow may proceed to step S20.
[Step S12: Determination of Diagonal Rear Collision]

The environment recognition unit 220 may determine whether the collision of the object such as the other vehicle V for which the pre-crash determination has been established is a diagonal rear collision in which the object collides with the vehicle 1 from the diagonal rear side.

If the collision is a diagonal rear collision (step S12: Y), the flow may proceed to step S18. Otherwise, i.e., if the collision is a side collision from the diagonal front side or the vehicle widthwise direction (step S12: N), the flow may proceed to step S13.
[Step S13: Determination of Collision Angle]

The environment recognition unit 220 may estimate a collision angle θ immediately before the object such as the other vehicle V collides with the own vehicle, and compare the estimated collision angle θ with a preset threshold θth.

If the collision angle θ is the threshold θth or greater (step S13: Y), the flow may proceed to step S15. Otherwise (step S13: N), the flow may proceed to step S14.
[Step S14: Determination of Collision Position]

The environment recognition unit 220 may estimate a collision position where the other vehicle V collides with the airbag 100, and determine whether the collision position is, in the vehicle front-rear direction, in front of the B pillar 70.

If the collision position is in front of the B pillar 70 (step S14: Y), the flow may proceed to step S16. Otherwise, i.e., if the collision position is in a region including the B pillar 70 (step S14: N), the flow may proceed to step S15.
[Step S15: Airbag Deployment (Low Pressure on Front Side and High Pressure on Rear Side)]

The airbag control unit 210 may activate the inflator 211 to generate the deployment gas and supply the deployment gas to the first air chamber 110 and the second air chamber 120, to thereby feed and deploy the first air chamber 110 and the second air chamber 120 of the airbag 100 from the front retainer 51F and the rear retainer 51R.

At this time, the internal pressure of the first air chamber 110 may be set to a lower pressure than the internal pressure of the second air chamber 120 to allow the first air chamber 110 to have a relatively low pressure and the second air chamber 120 to have a relatively high pressure.

In this case, the second air chamber 120 may not be subjected to pressure reduction by the second air chamber pressure regulating valve 213.

For the first air chamber 110, the first air chamber pressure regulating valve 212 may be kept in an open state at a predetermined opening degree.

Thus, upon receiving the load applied by the collision, the first air chamber 110 is able to contract while exhausting the internal deployment gas from the first air chamber pressure regulating valve 212 to absorb energy.

Thereafter, the flow may proceed to step S17.

[Step S16: Airbag Deployment (Equal Pressures on Front and Rear Sides)]

The airbag control unit 210 may activate the inflator 211 to generate the deployment gas and supply the deployment gas to the first air chamber 110 and the second air chamber 120, to thereby feed and deploy the first air chamber 110 and the second air chamber 120 of the airbag 100 from the front retainer 51F and the rear retainer 51R.

At this time, the internal pressures of the first air chamber 110 and the second air chamber 120 may be set equal to the internal pressure of the second air chamber 120 in step S15.

In this case, the first air chamber 110 and the second air chamber 120 may not be subjected to pressure reduction by the first air chamber pressure regulating valve 212 and the second air chamber pressure regulating valve 213.

Thereafter, the flow may proceed to step S17.

[Step S17: Execution of Airbag Forward Movement Control]

The airbag control unit 210 may perform airbag forward movement control of giving a command to the actuators of the front-rear movement mechanism 300 to displace the first air chamber 110 and the second air chamber 120 of the airbag 100 to the front side with respect to the vehicle body of the vehicle 1.

Positions of the first air chamber 110 and the second air chamber 120 after completion of the displacement may be, for example, matched with positions of the first air chamber 110 and the second air chamber 120 in the airbag device according to the first example embodiment.

Thereafter, the series of processes may be ended.

By the control described above, in a case where an object such as the other vehicle V comes into side collision from the diagonal front side or the side of the vehicle 1, it is possible to achieve example effects similar to the example effects described with reference to FIG. 6 to FIG. 8 in the first example embodiment.

[Step S18: Airbag Deployment (Low Pressure on Front Side and High Pressure on Rear Side)]

The airbag control unit 210 may activate the inflator 211 to generate the deployment gas and supply the deployment gas to the first air chamber 110 and the second air chamber 120, to thereby feed and deploy the first air chamber 110 and the second air chamber 120 of the airbag 100 from the front retainer 51F and the rear retainer 51R.

At this time, the internal pressure of the first air chamber 110 may be set to a lower pressure than the internal pressure of the second air chamber 120 to allow the first air chamber 110 to have a relatively low pressure and the second air chamber 120 to have a relatively high pressure.

Thereafter, the flow may proceed to step S19.

[Step S19: Execution of Airbag Rearward Movement Control]

The airbag control unit 210 may perform airbag rearward movement control of giving a command to the actuators of the front-rear movement mechanism 300 to displace the first air chamber 110 and the second air chamber 120 of the airbag 100 to the rear side with respect to the vehicle body of the vehicle 1.

An amount of the displacement may be set to allow movement to the rearmost end of a movable range of the front retainer 51F and the rear retainer 51R. In another example, the control may be performed to allow movement to an intermediate position within the movable range, depending on the collision position of the object such as the other vehicle V detected by the environment recognition unit 220.

Thereafter, the series of processes may be ended.

[Step S20: Local Collision Determination]

The environment recognition unit 220 may estimate the possibility of the vehicle 1 slipping sideway and departing from a lane, for example, to collide with a relatively small object that can cause local damage to the vehicle body on the side surface of the vehicle body. Non-limiting examples of the relatively small object may include poles, such as a traffic light pole or a utility pole, and a tree.

If the possibility of such a collision is a predetermined value or more (step S20: Y), the environment recognition unit 220 may establish local collision determination, and the flow may proceed to step S21. Otherwise (step S20: N), the series of processes may be ended.

[Step S21: Airbag Deployment (Equal Pressures on Front and Rear Sides)]

The airbag control unit 210 may activate the inflator 211 to generate the deployment gas and supply the deployment gas to the first air chamber 110 and the second air chamber 120, to thereby feed and deploy the first air chamber 110 and the second air chamber 120 of the airbag 100 from the front retainer 51F and the rear retainer 51R.

At this time, the internal pressures of the first air chamber 110 and the second air chamber 120 may be set equal to the internal pressure of the second air chamber 120 in step S15.

In this case, the first air chamber 110 and the second air chamber 120 may not be subjected to pressure reduction by the first air chamber pressure regulating valve 212 and the second air chamber pressure regulating valve 213.

Thereafter, the flow may proceed to step S22.

[Step S22: Collision Position Following Control]

The airbag control unit 210 may execute collision position following control of giving a command to the actuators of the front-rear movement mechanism 300 to move the first air chamber 110 and the second air chamber 120 in the front-rear direction with respect to the side sill 50, to allow one or both of the first air chamber 110 and the second air chamber 120 of the airbag 100 to cover the collision position of the object, such as a pole, with the vehicle body estimated by the environment recognition unit 220.

Thereafter, the series of processes may be ended.

Described below are a state and example effects after a side collision in the vehicle including the airbag device according to the third example embodiment.

As described above, example effects achieved in a case where the vehicle 1 is subjected to a side collision with an object such as the other vehicle V from the diagonal front side may be similar to the example effects of the first example embodiment described with reference to FIG. 6 to FIG. 8.

Figure 12:
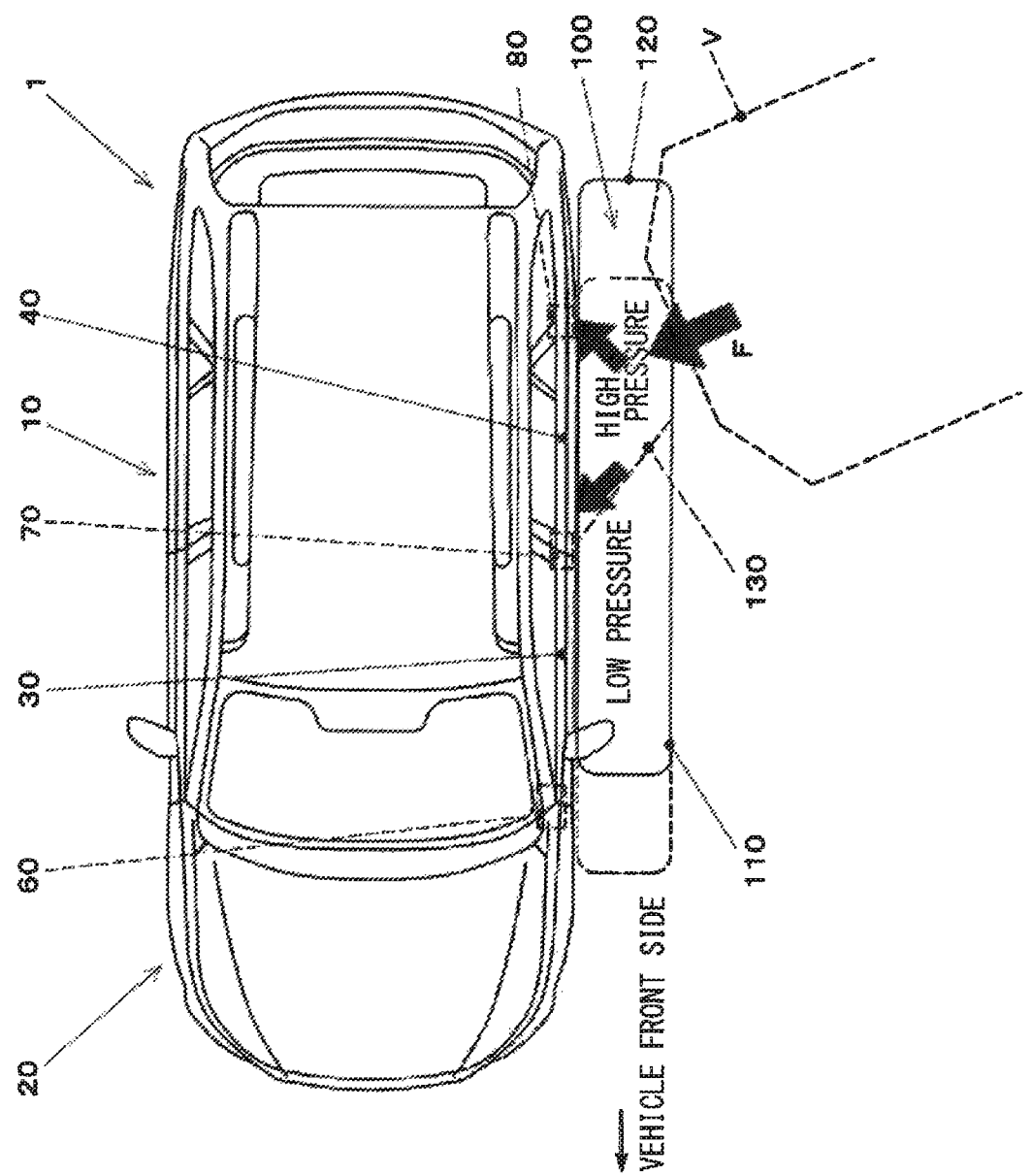
FIG. 12 is a schematic view of a state immediately after collision of the vehicle including the airbag device according to one example embodiment, and illustrates a state in which a region behind a B pillar is subjected to a side collision from a diagonal rear side.

FIG. 12 is a schematic view of a state immediately after collision of the vehicle including the airbag device according to the third example embodiment, and illustrates a state in which a region behind the B pillar is subjected to a side collision from the diagonal rear side.

In this case, the first air chamber 110 may be made to have a lower pressure than the second air chamber 120 (step S18).

The other vehicle V may collide mainly with the second air chamber 120 from the diagonal rear side of the vehicle 1, and transmit the load F to, for example, the rear side door 40, the B pillar 70, the C pillar 80, and the side sill 50 via the second air chamber 120.

This makes it possible to obtain a uniform load to strongly push the B pillar 70, making it possible to effectively transmit the load F applied from the other vehicle V to the second air chamber 120 to a vehicle body structure such as the B pillar 70.

This reduces local deformation of the rear side door 40, making it possible to suppress deformation of the rear side door 40 resulting in entry into the vehicle compartment 10.

Figure 13:
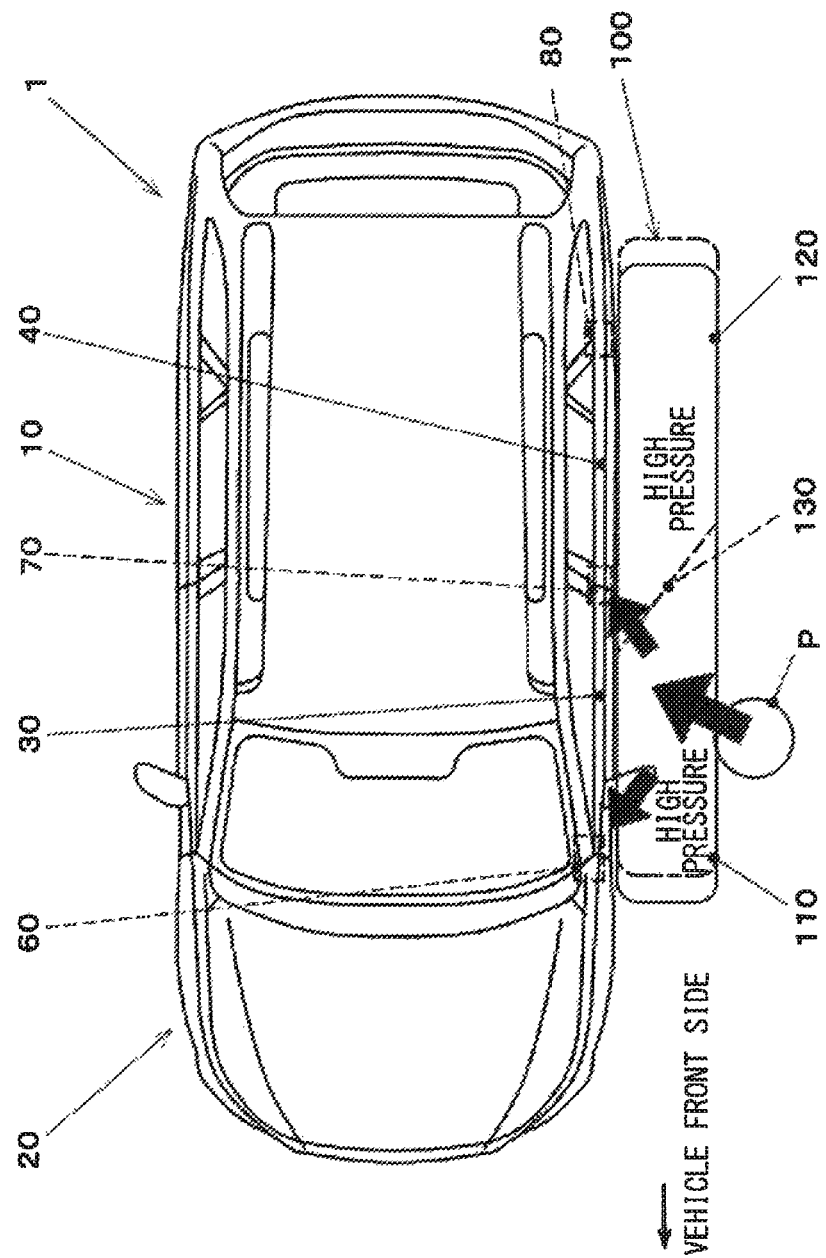
FIG. 13 is a schematic view of a state immediately after collision of the vehicle including the airbag device according to one example embodiment, and illustrates a state in which a pole comes into a local side collision.

FIG. 13 is a schematic view of a state immediately after collision of the vehicle including the airbag device according to the third example embodiment, and illustrates a state in which a pole comes into a local side collision.

In this case, the first air chamber 110 and the second air chamber 120 may be made to have equal pressures, e.g., equal high pressures (step S21).

For example, a pole P such as a utility pole or a traffic light pole may collide with the vehicle 1 toward the vicinity of the middle part of the front side door 30 from the diagonal front side of the vehicle 1, due to lane departure involving side slip of the vehicle 1.

For this collision, the airbag 100 may be moved forward by the front-rear movement mechanism 300 into a state in which the pole P collides with a middle part of the first air chamber 110.

The load applied from the pole P to the first air chamber 110 may be transmitted to, for example, the A pillar 60, the B pillar 70, the side sill 50, and the front side door 30 in a distributed manner via the first air chamber 110.

This suppresses great local deformation of the front side door 30, making it possible to reduce damage to an occupant due to entry of the front side door 30 into the vehicle compartment 10.

As described above, according to the third example embodiment, it is possible to achieve example effects similar to those of the first example embodiment described above. In addition, the first air chamber 110 and the second air chamber 120 of the airbag 100 may be moved in the front-rear direction with respect to the vehicle body by the front-rear movement mechanism 300. This makes it possible to transmit the load from the object to the vehicle body more accurately, making it possible to promote the example effects described above.

Modification Examples

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

(1) Configurations of the airbag device and the vehicle may be changed as appropriate, without being limited to the example embodiments described above.

For example, shapes, structures, materials, manufacturing methods, numbers, arrangements, etc. of the members included in the airbag device and the vehicle may be changed as appropriate.

(2) A configuration of the airbag, an arrangement of the air chambers, etc. may be changed as appropriate, without being limited to the configurations according to the example embodiments. For example, the third air chamber may be omitted in a case where energy absorption at an upper part of the door is possible by another method. Another air chamber may be additionally provided in addition to the air chambers described above, Each air chamber may be further divided.

(3) A method of detecting a symptom of collision may be changed as appropriate without being limited to the method using the sensors in the example embodiments. For example, another type of sensor may be used in addition to or in place of the sensors in the example embodiments. In another example, a symptom of collision may be detected by inter-vehicle communication or road-to-vehicle communication.

(4) In the example embodiments, the container, e.g., the retainer 51, that contains the undeployed airbag 100 may be provided inside the lower part of the side sill 50. However, a place where the container is provided may be changed as appropriate, without being limited thereto. For example, the container may be provided on an underside of the floor panel, or inside a side step, which is an aerodynamic part with design provided on the side sill.

(5) The control of the internal pressures of the first air chamber and the second air chamber depending on the collision mode in each of the example embodiments is an example, and may be changed as appropriate.

As described above, according to at least one embodiment of the disclosure, it is possible to provide an airbag device that suppresses collision damage upon a side collision.

Each of the airbag control unit 210 and the environment recognition unit 220 illustrated in FIG. 4 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the airbag control unit 210 and the environment recognition unit 220. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of The airbag control unit 210 and the environment recognition unit 220 illustrated in FIG. 4.

The invention claimed is:

1. An airbag device to be applied to a vehicle, the vehicle being provided with an A pillar, a B pillar, and a C pillar that are structural members provided in order from a front side on a side surface of a vehicle body of the vehicle and extending in a vertical direction, a door provided to be openable and closable at a door opening provided at one or both of a position between the A pillar and the B pillar and a position between the B pillar and the C pillar, and a side sill disposed along a lower edge of the door, the airbag device comprising:

an airbag configured to be deployed from a container to be disposed on a lower side of the side sill to a region on a vehicle-widthwise outside of the side surface of the vehicle body comprising the door, in response to a symptom of collision of an object with the side surface of the vehicle body, the airbag comprising a first air chamber configured to be disposed mainly in front of the B pillar after being deployed and a second air chamber configured to be disposed mainly behind the B pillar after being deployed;

a collision mode predictor configured to predict a collision mode of the object with the vehicle; and a pressure controller configured to control an internal pressure of the first air chamber and an internal pressure of the second air chamber, wherein, based on the collision mode predicted by the collision mode predictor and after the airbag is deployed, the pressure controller;

increases or decreases one of an internal pressure of the first air chamber and an internal pressure of the second air chamber independently of the other internal pressure; or increases or decreases the internal pressure of the first air chamber and the internal pressure of the second air chamber independently of each other.

2. The airbag device according to claim 1, wherein the pressure controller is configured such that, in a case where the collision mode predictor predicts a side collision at a collision angle equal to or greater than a predetermined threshold with a region including the B pillar on the side surface of the vehicle body, the pressure controller sets the internal pressure of the second air chamber to a higher pressure than the internal pressure of the first air chamber.

3. The airbag device according to claim 2, further comprising an airbag mover configured to move the airbag in a front-rear direction with respect to the side surface of the vehicle body, based on the collision mode predicted by the collision mode predictor.

4. The airbag device according to claim 1, wherein the pressure controller is configured such that, in a case where the collision mode predictor predicts a collision from a diagonal front side at a collision angle less than a predetermined threshold with a region in front of the B pillar on the side surface of the vehicle body, the pressure controller sets the internal pressure of the first air chamber to a pressure equal to or higher than the internal pressure of the second air chamber.

5. The airbag device according to claim 4, further comprising an airbag mover configured to move the airbag in a front-rear direction with respect to the side surface of the vehicle body, based on the collision mode predicted by the collision mode predictor.

6. The airbag device according to claim 1, wherein the pressure controller is configured such that, in a case where the collision mode predictor predicts a collision from a diagonal front side at a collision angle less than a predetermined threshold with a region behind the B pillar on the side surface of the vehicle body, the pressure controller sets the internal pressure of the second air chamber to a higher pressure than the internal pressure of the first air chamber.

7. The airbag device according to claim 6, further comprising an airbag mover configured to move the airbag in a front-rear direction with respect to the side surface of the vehicle body, based on the collision mode predicted by the collision mode predictor.

8. The airbag device according to claim 1, further comprising a first air chamber pressure regulating valve and a second air chamber pressure regulating valve provided in the first air chamber and the second air chamber, respectively.

9. The airbag device according to claim 8, wherein the first air chamber pressure regulating valve and the second air chamber pressure regulating valve each are a control valve that adjusts the internal pressure of the first air chamber and the internal pressure of the second air chamber independently of each other based on a signal from the pressure controller.

10. The airbag device according to claim 9, wherein the first air chamber pressure regulating valve and the second air chamber pressure regulating valve release a portion of deployment gas inside the corresponding air chamber to the outside to decrease the internal pressure of the corresponding air chamber.

11. The airbag device according to claim 9, wherein the first air chamber pressure regulating valve releases a portion of deployment gas inside the first air chamber to the outside to decrease the internal pressure of the first air chamber, and wherein the second air chamber pressure regulating valve remains closed to maintain the internal pressure of the second air chamber at a value greater than the internal pressure of the first air chamber.

12. The airbag device according to claim 1, wherein, based on the collision mode predicted by the collision mode predictor and after the airbag is deployed, the pressure controller changes the internal pressure of the first air chamber relative to the internal pressure of the second air chamber.

13. The airbag device according to claim 1, wherein a value of the internal pressure of the first air chamber is different than a value of the internal pressure of the second air chamber.

14. An airbag device to be applied to a vehicle, the vehicle being provided with an A pillar, a B pillar, and a C pillar that are structural members provided in order from a front side on a side surface of a vehicle body of the vehicle and extending in a vertical direction, a door provided to be openable and closable at a door opening provided at one or both of a position between the A pillar and the B pillar and a position between the B pillar and the C pillar, and a side sill disposed along a lower edge of the door, the airbag device comprising:

an airbag configured to be deployed from a container to be disposed on a lower side of the side sill to a region on a vehicle-widthwise outside of the side surface of the vehicle body comprising the door, in response to a symptom of collision of an object with the side surface of the vehicle body, the airbag comprising a first air chamber configured to be disposed mainly in front of the B pillar after being deployed and a second air chamber configured to be disposed mainly behind the B pillar after being deployed;

a collision mode predictor configured to predict a collision mode of the object with the vehicle;

a pressure controller configured to, based on the collision mode predicted by the collision mode predictor, increase or reduce one of an internal pressure of the first air chamber and an internal pressure of the second air chamber independently of the other internal pressure, or increase or reduce the internal pressure of the first air chamber and the internal pressure of the second air chamber independently of each other; and an airbag mover configured to move the airbag in a front-rear direction with respect to the side surface of the vehicle body, based on the collision mode predicted by the collision mode predictor.

15. An airbag device to be applied to a vehicle, the vehicle being provided with an A pillar, a B pillar, and a C pillar that are structural members provided in order from a front side on a side surface of a vehicle body of the vehicle and extending in a vertical direction, a door provided to be openable and closable at a door opening provided at one or both of a position between the A pillar and the B pillar and a position between the B pillar and the C pillar, and a side sill disposed along a lower edge of the door, the airbag device comprising:

an airbag configured to be deployed from a container to be disposed on a lower side of the side sill to a region on a vehicle-widthwise outside of the side surface of the vehicle body comprising the door, in response to a symptom of collision of an object with the side surface of the vehicle body, the airbag comprising a first air chamber configured to be disposed mainly in front of the B pillar after being deployed and a second air chamber configured to be disposed mainly behind the B pillar after being deployed;

a collision mode predictor configured to predict a collision mode of the object with the vehicle; and a pressure controller configured to control an internal pressure of the first air chamber and an internal pressure of the second air chamber, wherein, based on the collision mode predicted by the collision mode predictor, the pressure controller decreases one of an internal pressure of the first air chamber and an internal pressure of the second air chamber independently of the other internal pressure.

* * * * *